United States Patent

Nanbu

[11] Patent Number: 6,042,037
[45] Date of Patent: Mar. 28, 2000

[54] LIGHTWEIGHT, REMOVABLE HANDLE FOR FISHING REEL WITH INTEGRAL STEM AND GRIP

[75] Inventor: Kazuya Nanbu, Saitama, Japan

[73] Assignee: Daiwa Seiko, Inc., Tokyo, Japan

[21] Appl. No.: 08/901,082

[22] Filed: Jul. 28, 1997

Related U.S. Application Data

[63] Continuation of application No. 08/531,860, Sep. 21, 1995, abandoned.

[30] Foreign Application Priority Data

Sep. 21, 1994 [JP] Japan ................................ 6-252812

[51] Int. Cl.⁷ .................................................. A01K 89/00
[52] U.S. Cl. ............................................. 242/283; 74/545
[58] Field of Search .................................. 242/283, 312, 242/310; 74/545

[56] References Cited

U.S. PATENT DOCUMENTS 2,713,274  7/1955  Lockwood ........................ 242/283 X
3,071,023  1/1963  Herr et al. ................................. 74/545
5,429,317  7/1995  Yamaguchi .............................. 242/283
5,660,344  8/1997  Testa ....................................... 242/283

FOREIGN PATENT DOCUMENTS 2421879   11/1974  Germany ............................... 242/283
58-117860  8/1983  Japan .
5-31904    8/1993  Japan .

Primary Examiner—Donald P. Walsh
Assistant Examiner—Emmanuel M. Marcelo
Attorney, Agent, or Firm—Sughrue, Mion, Zinn, Macpeak & Seas, PLLC

[57] ABSTRACT

In a handle for a fishing reel, a support shaft is fixedly secured at one end to a distal end of a handle arm by compressive clamping in such a manner that the support shaft projects from the handle arm. The tubular stem of a handle piece is rotatably mounted on the outer periphery of the support shaft, and is retained by a retaining member against disengagement therefrom. A grip portion integral with the tubular stem has a cavity extending between opposite ends of the grip portion. A pair of caps closing the opposite open ends are detachably fixed to the grip portion by a resilient member. The handle is light weight, and thus can be operated with a small amount of force.

14 Claims, 5 Drawing Sheets

LIGHTWEIGHT, REMOVABLE HANDLE FOR FISHING REEL WITH INTEGRAL STEM AND GRIP

This application is a continuation of application Ser. No. 08/531,860 filed Sep. 21, 1995 now abandoned.

BACKGROUND OF THE INVENTION

This invention relates to a handle for a fishing reel in which a handle piece is mounted on a handle arm for winding a fishline on a spool.

In a conventional handle disclosed, for example, in (1) Japanese Utility Model Unexamined Publication No. 58-117860 and (2) Japanese Utility Model Examined Publication No. 5-31904, a handle piece is retainingly supported rotatably on a support shaft fixedly mounted on a distal end of a handle arm.

A mounting hole for receiving the support shaft therein is formed in a central portion of the handle piece, and a recess is formed in each of opposite ends of this piece, and a cap is fixedly attached relative to each end. With this construction, lubricating oil can be applied through the mounting hole to that portion of the handle piece rotatable relative to the support shaft.

With the above construction, however, the overall weight of the reel is heavy, and that portion of a reel body having the handle is heavier than the other portion. Thus, the balance of rotation of the handle is not good, and consequently the fishing operability is poor.

Furthermore, the above publication (1) has a problem in that dirt and other foreign matter can collect on the lubricating portion, and the above publication (2) has a problem in that maintenance can not be carried out easily.

In short, the problems to be solved are that of poor fishing operability because of the increased weight of the handle, and the difficulty of carrying out maintenance.

SUMMARY OF THE INVENTION

With the above drawbacks in view, it is an object of this invention to provide a handle for a fishing reel which can be operated with little force.

The above object has been achieved by the following apparatus.

According to the invention, there is provided a handle for a fishing reel wherein a handle piece is retainingly supported rotatably on a support shaft fixedly secured to one end of a handle arm of the handle mounted on a drive shaft of a reel body. The handle piece comprises a tubular stem mounted on the support shaft and rotatable about an axis, and a grip portion formed integrally at a distal end of the tubular stem. A cavity is formed in the grip portion, and extends longitudinally across the axis of the grip portion; and there is provided a cap closing an open end of the cavity.

Preferably, the cap closing the open end of the grip portion is detachable therefrom. The handle piece may be rotatably retained on the support shaft by a retaining member so that by removing the retaining member the handle piece can be removed from the support shaft. The cap may be detachably fixed to and pressed against the open end of the grip portion by a resilient force of a resilient member.

In the handle for a fishing reel according to the present invention, the grip portion is lightweight because of the provision of the longitudinal cavity extending between the opposite ends of the grip portion, and with this arrangement the weight imbalance and the balance of rotation of the handle are improved, and therefore the fishing operability when rotating the handle piece is enhanced.

DETAILED DESCRIPTION OF THE PREFERRED EMBODIMENTS

Figure 1:
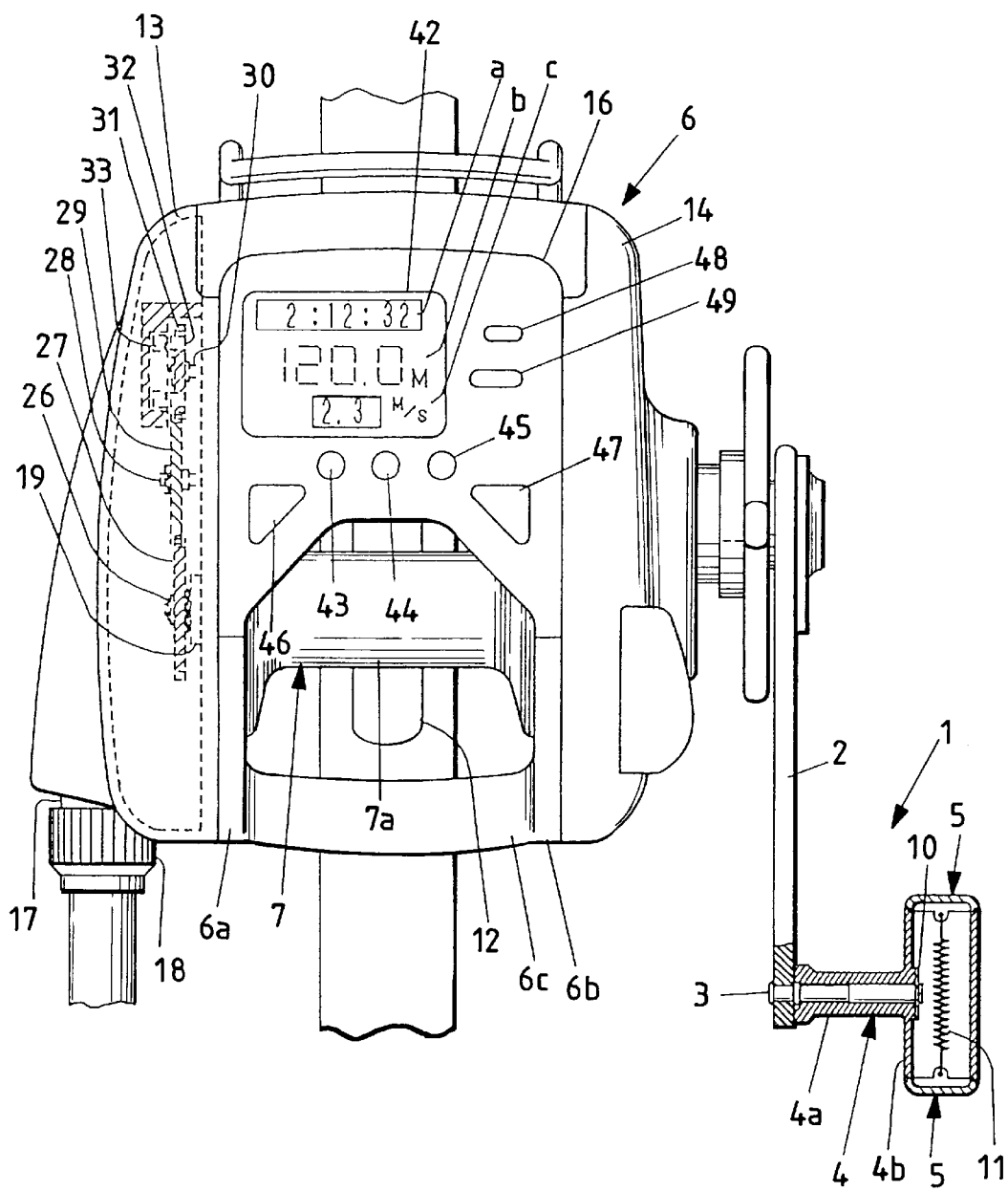
FIG. 1 is a plan view of a first embodiment of a fishing reel of the invention, with a handle piece shown in cross-section.
Figure 2:
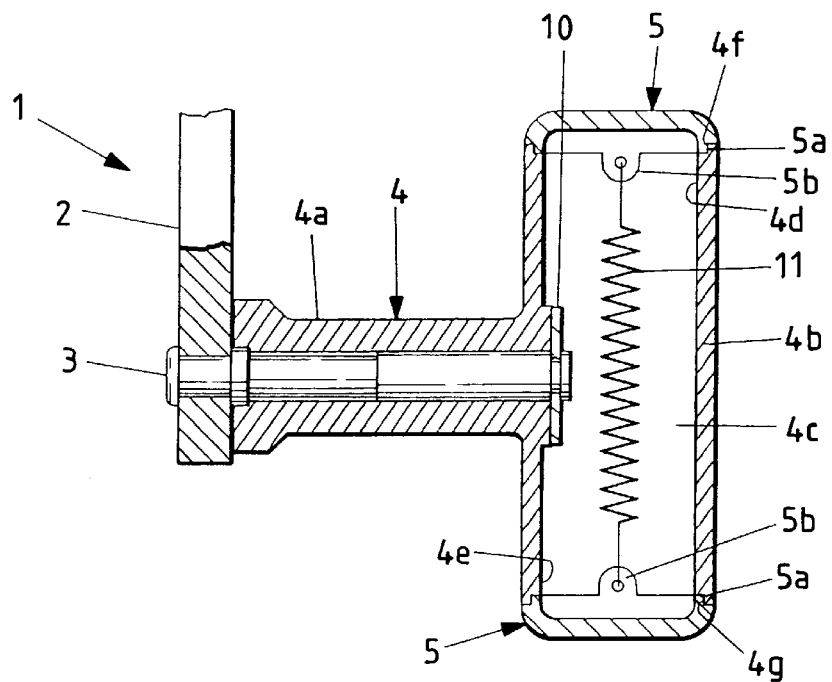
FIG. 2 is an enlarged, horizontal cross-sectional view of the handle piece.
Figure 3:
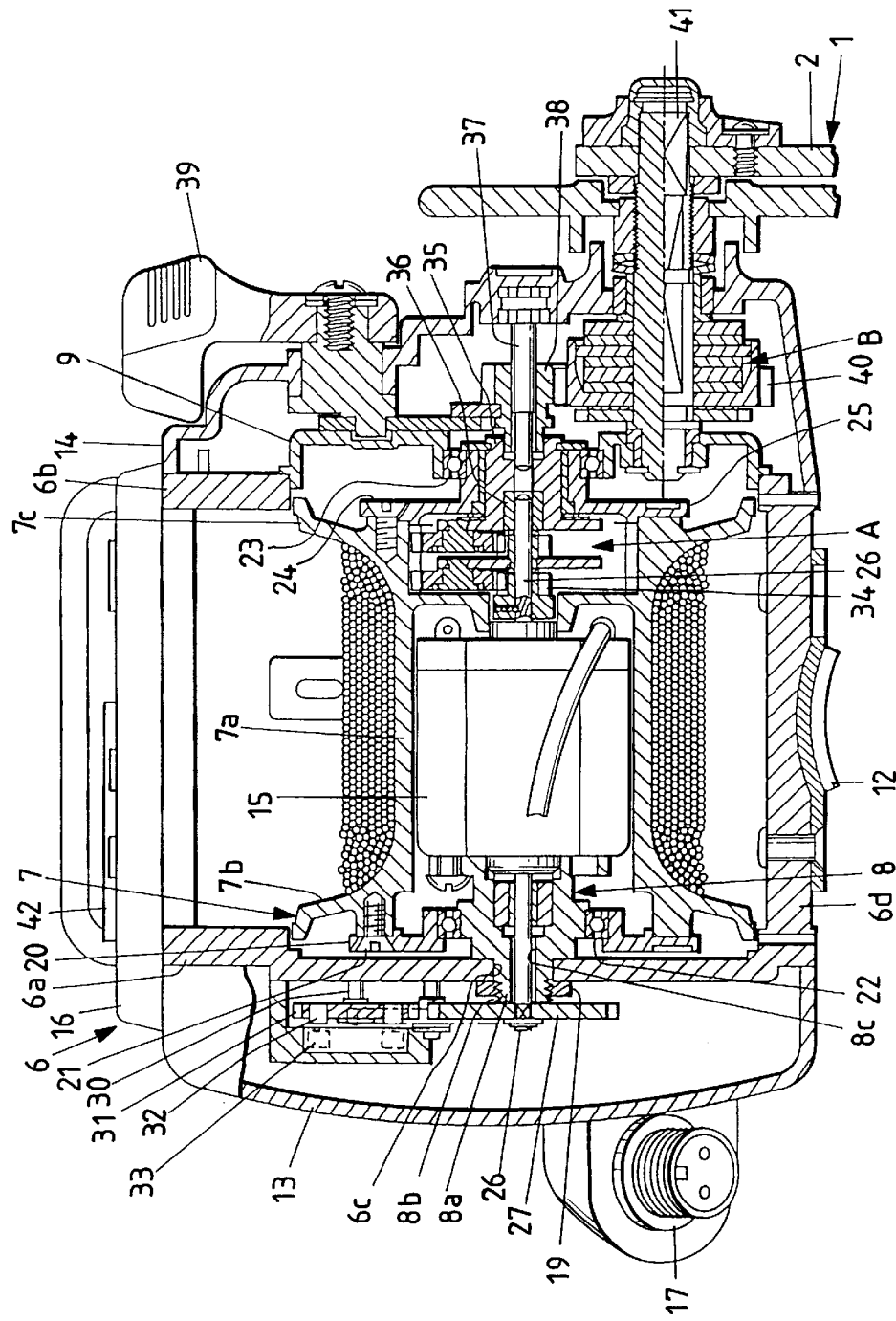
FIG. 3 is a cross-sectional, rear view of the fishing reel.

A preferred embodiment of the present invention will now be described with reference to the drawings. FIGS. 1 and 2 show a fishing reel having a first embodiment of a handle of the invention. More specifically, FIG. 1 is a plan view of the fishing reel, with a handle piece shown in cross-section, FIG. 2 is an enlarged, horizontal cross-sectional view of the handle piece, and FIG. 3 is a cross-sectional, rear view of the fishing reel.

Referring to FIGS. 1 and 2, in the handle 1 for the fishing reel, an end of a support shaft 3 is fixedly secured to a distal end of a handle arm 2 by caulking or compressive clamping in such a manner that the support shaft 3 projects from the handle arm 2. A tubular stem 4a of the handle piece 4 is rotatably mounted on the outer periphery of the support shaft 3, and is retained by a retaining member 10 against disengagement therefrom.

The handle piece 4 comprises the tubular stem 4a, a grip portion 4b which is formed integrally at one end of the tubular stem 4a, and has a communication hole or cavity 4c formed in the grip portion 4b and extending between opposite ends of the grip portion 4b along the length thereof, a pair of caps 5 closing the opposite open ends 4d and 4e of the cavity 4c, respectively, and a resilient member 11 detachably fixing the pair of caps 5 and 5 respectively to the open ends 4d and 4e by a resilient force.

Step portions 4f and 4g are formed on the open ends 4d and 4e, respectively, and projecting portions 5a of the caps 5 are engaged with the step portions 4f and 4g, respectively. Retaining portions 5b retaining the resilient member 11 are formed on the inner sides of the caps 5, respectively.

The length of the caps 5 may be larger than that shown in the drawings, and also longer caps and other modified caps may be prepared for exchanging purposes.

As shown in FIGS. 1 and 3, in the fishing reel, opposite (left and right) side frames 6a and 6b of a reel body 6, a support wall 6c and a fixing plate 6d of a reel leg 12 are formed integrally with one another, and the left and right side frames 6a and 6b are disposed parallel to each other. Reel side plates 13 and 14 of the reel body 6 are attached respectively to the outer sides of the left and right side frames 6a and 6b.

A spool 7 is rotatably supported between the opposite side frames 6a and 6b disposed inwardly of the reel side plates 13 and 14, respectively. An electric motor 15 is mounted within a fishline winding portion 7a of the spool 7, and the spool 7 is rotated by the electric motor 15 and the handle 1 mounted outside of the reel side plate 14.

A base 16, incorporating a control circuit for the electric motor 15, is mounted on those portions of the left and right side frames 6a and 6b disposed above and forward of the spool 7.

A feeder cord connection portion 17 is mounted on the reel side plate 13.

A feeder cord connector 18 is connected to the feeder cord connection portion 17, and a battery (not shown) is connected to the feeder cord connector 18.

A fixing member 8 is fixedly secured to one side or end of a motor body of the electric motor 15, and a shaft portion 8a of the fixing member 8 is passed through a central hole 6c in the left side frame 6a, and a nut 19 is threaded on external threads 8b, thereby fixing the fixing member 8 to the side frame 6a.

A rotary disk-shaped support portion 20 is fixedly secured by screws 21 to a flange 7b formed on one end of the spool 7, and this support portion 20 is rotatably supported on the fixing member 8 through a ball bearing 22 of a bearing portion.

A rotary disk-shaped inner side plate 9 is fixedly secured to the outer side of the side frame 6b covered by the reel side plate 14, and a rotary disk 25, fixedly secured by screws 24 to a flange 7c formed at the other end of the spool 7, is supported on the inner side plate 9 through a ball bearing 23.

Thus, the rotary disk-shaped support portion 20 and the rotary disk 25, fixedly secured respectively to the opposite ends of the spool 7, are rotatably supported respectively by the fixing member 8 and the rotary disk-shaped inner side plate 9 through the respective ball bearings 22 and 23, and the fixing member 8 and the inner side plate 9 are supported by the left side frame 6a and the right side frame 6b, respectively.

A rotation shaft 26, projecting from one end of the electric motor 15 fixedly secured to the fixing member 8, extends through a through hole 8c in the fixing member 8, and projects outwardly.

An output gear 27 of a line length measurement mechanism is fixedly mounted on the outwardly-projecting portion of the rotation shaft 26, and a gear 29 mounted on a shaft 28 is in mesh with the output gear 27, and a gear 31 mounted on a shaft 30 is in mesh with the gear 29.

A magnet 32 is fixedly mounted on one side of the gear 31.

A Hall element 33 of a detector is fixedly provided outside of the side frame 6a so as to face the magnet 32.

The Hall element 33 is connected through lead wires to the control circuit for the electric motor 15 provided in the base 16.

The line length measurement mechanism may be of any suitable construction, such as for detecting the number of rotations of the spool, or for detecting the number of rotations of a roller pressed against the line-winding outer peripheral surface.

A drive mechanism A comprising a planetary gear is mounted within the internal space or bore of the spool 7 at the other end thereof, and a pinion 34 is fixedly mounted on that portion of the rotation shaft 26 projecting from the other end of the electric motor 15, and is in mesh with a gear of the drive mechanism A.

An output of the drive mechanism A is transmitted to a rotary member 35 fitted in a central portion of the rotary disk 25, and a metal bearing 36 is fixedly mounted in one side of the rotary member 35 at a central portion thereof. The rotation shaft 26 is fitted in a central hole in the metal bearing 36, and a support shaft 37, fixedly mounted on the reel side plate 14, is fitted in a central hole in the rotary member 35.

A drive pinion 38 is mounted on the outer periphery of the support shaft 37, and a clutch portion, formed between the drive pinion 38 and the rotary member 35, is engaged and disengaged by operating a clutch lever 39.

A drive gear 40 is in mesh with the drive pinion 38, and the drive gear 40 is made rotatable by a drive shaft 41 through a drag braking member B. The handle arm 2 of the handle 1 is mounted on that portion of the drive shaft 41 projecting from the reel side plate 14.

As shown in FIG. 1, a liquid crystal display portion 42 for displaying data such as the length of the fishline measured by the line length measurement mechanism, as well as a group of operating buttons, are provided on the base 16.

The liquid crystal display portion 42 has a time display function (stop watch function) a for indicating time, elasped time from the start of the fishing and time sinking of a sinker and others, a line length display function b, and a speed display function c for indicating the sinking speed and the wind-up speed.

A function selecting button 43, a reset button 44 and a start/stop button 45 are provided adjacent to the lower side of the liquid crystal display portion 42.

Two motor operation control switches 46 and 47 are provided on the base 16, and are disposed adjacent to the left and right side frames 6a and 6b, respectively. Switches 46 and 47 for specifying a shelf or water layer, setting the alarm and effecting a clear operation are also provided.

One of the two motor operation control switches 46 and 47 is the continuous rotation switch, and the other is the discontinuous rotation switch.

When using the fishing reel, the handle piece 4 of the handle 1 is gripped by the hand, and is turned, and the two motor operation control switches 46 and 47 are operated so as to wind the fishline 50 on the spool 7.

The grip portion 4b for turning the handle piece 4 is lightweight because of the provision of the longitudinal cavity or communication hole 4c extending between the opposite ends of the grip portion 4b, and with this arrangement a weight imbalance and the balance of rotation of the handle are improved, and therefore the fishing operability is enhanced.

The grip portion 4b is hollow, and the caps 5 are respectively detachably fixed to and pressed against the opposite ends of this grip portion by the resilient force of the resilient member 11, thus closing these opposite ends, respectively. Therefore, dirt and other foreign matters are prevented from intruding from the exterior into the grip portion, and hence will not deposit on the support shaft 3 and the retaining member 10. And besides, a lubricating operation can be carried out easily, and a smooth rotation of the handle piece 4 can be maintained.

Since the caps 5 can be exchanged with other caps different in length from the caps 5, the size of the handle piece 4 can be suitably changed in accordance with the size of the hand.

The caps 5 and 5 can be detached respectively from the opposite open ends 4d and 4e of the grip portion 4b of the handle piece 4, and then the retaining member 10 can be removed, so that the handle piece 4 can be removed from the support shaft 3. Therefore, adequate maintenance can be performed after fishing.

The liquid crystal display portion 42 has the time display function (stop watch function) a for indicating time, the elasped time of elapse from the start of the fishing and time sinking of a sinker and others, the line length display function b, and the speed display function c for indicating the sinking speed and the wind-up speed. With this arrangement, the following advantages can be realized.

The elapsed time elapse from the start of the fishing can be found by the time display function a.

By measuring the time of movement of a boat, wasteful casting can be avoided.

By measuring the time for of a fishhook to get to shelf, the time for the fishhook to get to the shelf in the next cast can be found.

The time of fighting can be measured.

A timer for ground bait can be provided.

The sinking speed can be found by the speed display function c, and the weight of sinking speed can be adjusted by increasing and decreasing the sinker, and the spool can be adjusted to such a degree as not to cause backlash.

The wind-up speed can be adjusted more accurately.

With the above construction of the handle 1 of the fishing reel, the grip portion 4b of the handle piece 4 is lightweight because of the provision of the longitudinal cavity or communication hole 4c extending between the opposite ends of the grip portion 4b, and with this arrangement the weight imbalance and the balance of rotation of the handle are improved, and therefore the fishing operability is enhanced.

The grip portion 4b is hollow, and the caps 5 are respectively detachably fixed to and pressed against the opposite ends of this grip portion by the resilient force of the resilient member 11, thus closing these opposite ends, respectively. Therefore, dirt and other foreign matter is prevented from intruding from the exterior into the grip portion, and hence will not deposit on the support shaft 3 and the retaining member 10. And besides, the lubricating operation and other operations can be carried out easily, and the smooth rotation of the handle piece 4 can be maintained.

The caps 5 can be suitably changed in length in accordance with the size of the hand.

The retaining member 10 can be removed, so that the handle piece 4 can be removed from the support shaft 3. Therefore, adequate maintenance can be performed after fishing.

Figure 4:
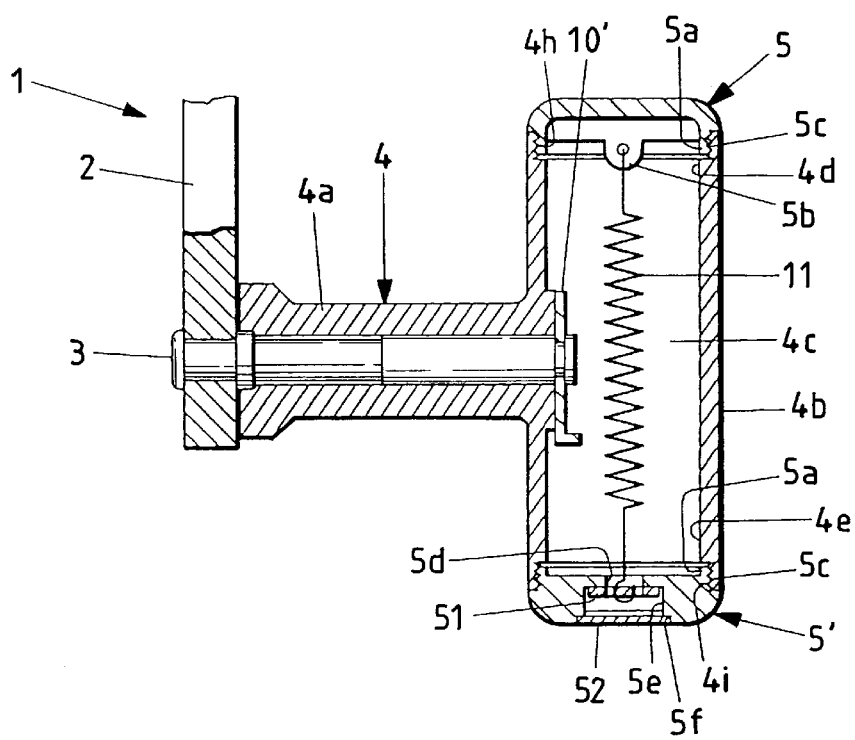
FIG. 4 is a enlarged, horizontal cross-sectional view of a handle piece of a second embodiment.

FIG. 4 shows a second embodiment of a handle of the invention and more specifically is an enlarged, horizontal cross-sectional view of a handle piece.

In the second embodiment of the handle 1 for a fishing reel, a support shaft 3 is fixedly secured at one end to a distal end of a handle arm 2 by caulking or compressive clamping in such a manner that the support shaft 3 projects from the handle arm 2. A tubular stem 4a of the handle piece 4 is rotatably mounted on the outer periphery of the support shaft 3, and is retained by a retaining member 10' against disengagement therefrom.

The retaining member 10' is bent into an L-shape so that it can be easily engaged and disengaged.

The handle piece 4 comprises the tubular stem 4a, a grip portion 4b which is formed integrally at one end of the tubular stem 4a, and has a communication hole or cavity 4c formed in the grip portion 4b and extending between opposite ends of the grip portion 4b along the length thereof, a pair of caps 5 and 5' closing the opposite open ends 4d and 4e of the cavity 4c, respectively, and a resilient member 11 detachably fixing the pair of caps 5 and 5' respectively to the open ends 4d and 4e by a resilient force.

Threaded portions 4h and 4i are formed on the open ends 4d and 4e, respectively, and are threaded respectively on threaded portions 5c formed respectively on outer peripheries of projected portions 5a of the caps 5 and 5'. A retaining portion 5b retaining one end of the resilient member 11 is formed on the inner side of the cap 5.

A through hole 5d is formed in the inner side of the cap 5', and a stepped holes, defined by two holed 5e and 5f, is formed in the outer side of the cap 5'.

A retaining washer 51 is received in the hole 5e, and retains the other end of the resilient member 11.

A decorative plate 52 is received in the hole 5f, and is bonded to the step between the two holes 5f and 5e.

The rest of the structure is generally the same as described in the preceding embodiment.

The threaded portions 4h, 4i and the threaded portions 5c are threaded in the same direction, and the twisting of the resilient member 11 is prevented by the retaining washer 51.

The threaded portions 4h and 4i may be threaded right and left, respectively, and the construction of the caps 5 and 5' other than the threads may be identical. The cap 5' is greater in mass than the cap 5, and therefore is normally held at a lower position.

Figure 5:
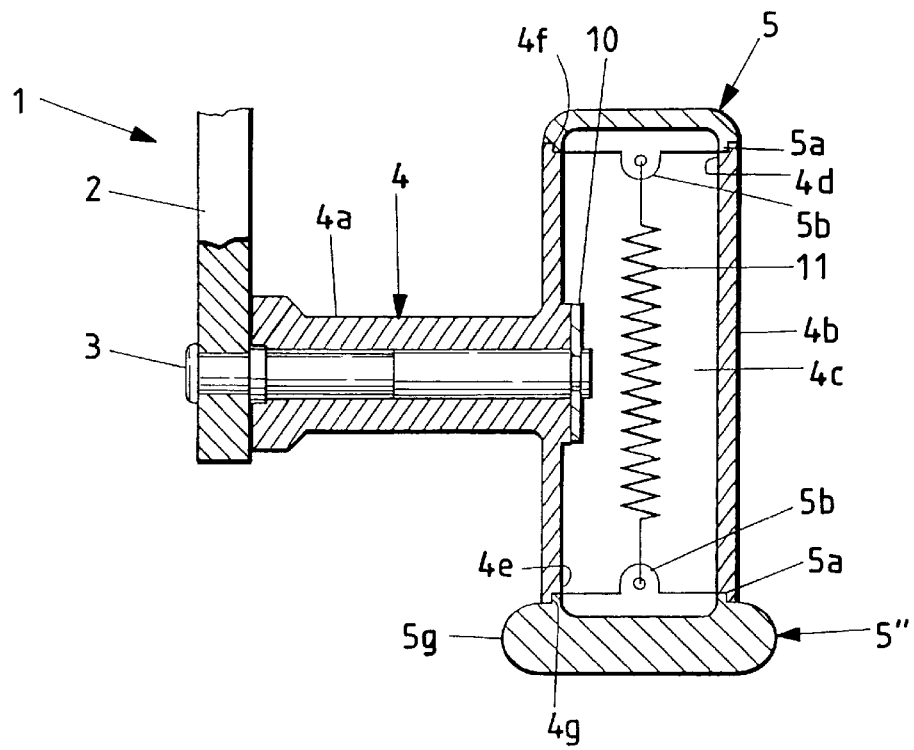
FIG. 5 is a enlarged, horizontal cross-sectional view of a handle piece of a third embodiment.

FIG. 5 shows a third embodiment of a handle of the invention, and more specifically is an enlarged, horizontal cross-sectional view of a handle piece.

In the third embodiment of the handle 1 for a fishing reel, a support shaft 3 is fixedly secured at one end to one end of a handle arm 2 by compressive clamping in such a manner that the support shaft 3 projects from the handle arm 2. A tubular stem 4a of the handle piece 4 is rotatably mounted on the outer periphery of the support shaft 3, and is retained by a retaining member 10 against disengagement therefrom.

The handle piece 4 comprises the tubular stem 4a, a grip portion 4b which is formed integrally at one end of the tubular stem 4a, and has a communication hole or cavity 4c formed in the grip portion 4b and extending between opposite ends of the grip portion 4b along the length thereof, a pair of caps 5 and 51 " closing the opposite open ends 4d and 4e of the cavity 4c, respectively, and a resilient member 11 detachably fixing the pair of caps 5 and 511 respectively to the open ends 4d and 4e by a resilient force.

Step portions 4f and 4g are formed on the open ends 4d and 4e, respectively, and projecting portions 5a of the caps 5 and 5" are engaged with the step portions 4f and 4g , respectively. Retaining portions 5b retaining the resilient member 11 are formed on the inner sides of the caps 5 and 5", respectively.

The cap 5" is formed into a larger-diameter portion 5g larger than the outer diameter of the grip portion 4b.

The cap 5" is larger in mass than the cap 5, and therefore is normally held at a lower position, so that the handle piece 4 can be gripped more easily.

The cap 5" may have any other suitable configuration, and for example, the cap 5" may have a greater length, or the larger-diameter portion 5g may be larger than that shown in FIG. 5.

The rest of the structure is generally the same as described in the above embodiments.

Figure 6:
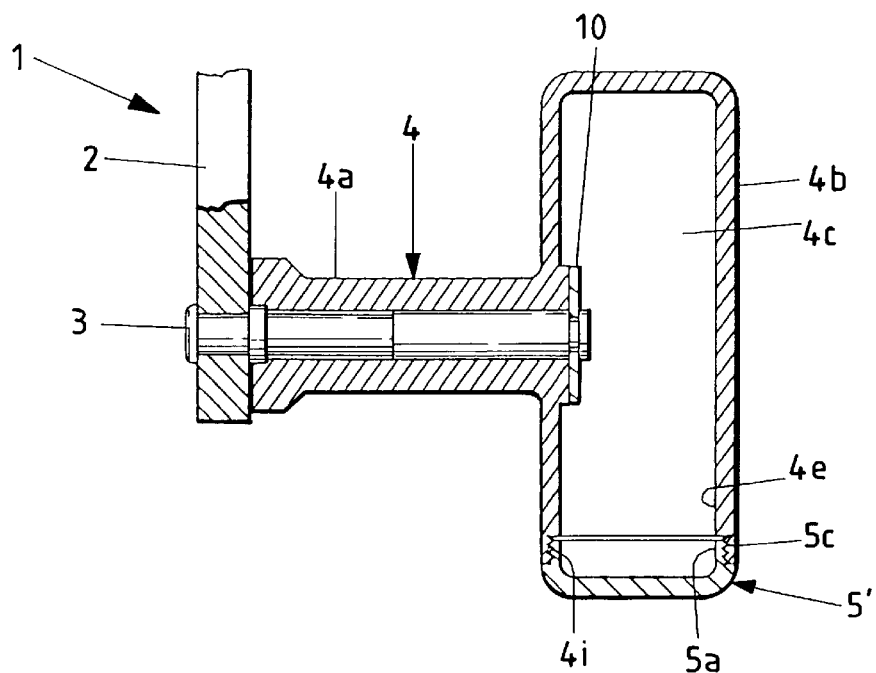
FIG. 6 is a enlarged, horizontal cross-sectional view of a handle piece of a fourth embodiment.

FIG. 6 is a fourth embodiment of a handle of the invention, and more specifically is an enlarged, horizontal cross-sectional view of a handle piece.

In the fourth embodiment of the handle 1 for a fishing reel, a support shaft 3 is fixedly secured at one end to one end of a handle arm 2 by compressive clamping in such a manner that the support shaft 3 projects from the handle arm 2. A tubular stem 4a of the handle piece 4 is rotatably mounted on the outer periphery of the support shaft 3, and is retained by a retaining member 10 against disengagement therefrom.

The handle piece 4 comprises the tubular stem 4a, a grip portion 4b which is formed integrally at one end of the tubular stem 4a, and has a cavity 4c formed in the grip portion 4b and extending longitudinally of the grip portion 4b, and a cap 5' closing an open end 4e of the cavity 4c. A threaded portion 4i is formed on the open end 4e, and is threaded on a threaded portion 5c formed on the outer periphery of a projected portion 5a of the cap 5'.

The rest of the structure is generally the same as described in the above embodiments.

Figure 7:
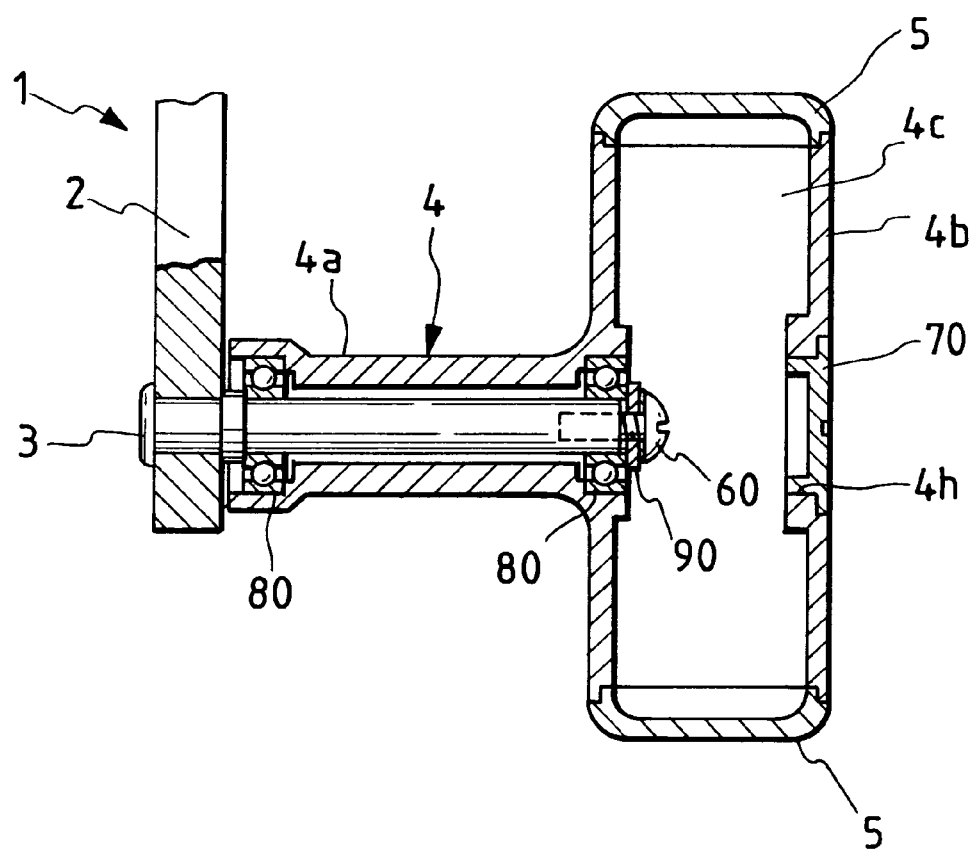
FIG. 7 is a enlarged, horizontal cross-sectional view of a handle piece of a fifth embodiment.

FIG. 7 shows a fifth embodiment of a handle of the invention.

In the fifth embodiment, a tubular stem 4a of a handle piece 4 is formed with a small inner diameter portion and a pair of larger inner diameter portions opposite each other with respect to the small inner diameter portion so that the tubular stem 4a is rotatably fitted on the support shaft 3 through a pair of bearings 80 installed in respective larger inner diameter portions. A grip portion 4b of the handle piece 4 is formed with a threaded hole 4h located opposite the tubular stem 4a across a cavity 4c and substantially concentric with respect to the tubular stem 4a. A cap 70 is threadingly engaged with the threaded hole 4h so that it is detachably mounted onto the handle piece 4.

In assembly, after the tubular stem 4a has been rotatably fitted on the support shaft 3 through the bearings 80, a screw 60 is threadingly engaged with an axial end of the support shaft 3 with a washer 90 interposed therebetween, so that the tubular stem 4a, and thus the handle piece 4, is rotatably retained on the support shaft 3 with the aid of the right-hand large inner diameter portion and the bearing therein. After the screw 60 has been tightened to the support shaft 3 in the above-noted manner, the cap 70 is threadingly engaged with the threaded hole 4h to close the cavity 4c. When the cap 70 is threadingly engaged with the threaded hole 4h, the outer surface of the cap 70 is made flush with the outer surface of the grip portion 4b. In addition, the other caps 5 are elastically fitted onto the grip portion 4 of the handle piece 4. In disassembly, the cap 70 is first removed from the grip portion 4b, and then the screw 60 is removed from the support shaft 3 and, as a consequence, the handle piece 4 can be removed from the support shaft 3.

The rest of the structure is generally the same as described in the above embodiments.

In the above embodiments, the opposite (left and right) side frames 6a and 6b of the reel body 6, the support wall 6c and the fixing plate 6d of the reel leg 12 are formed integrally with one another, and the left and right side frames 6a and 6b are disposed parallel to each other. However, these parts may be constituted by respective separate members, even in which case the left and right side frames 6a and 6b are held parallel to each other.

In the construction of the present invention, the grip portion of the handle piece is lightweight because of the provision of the longitudinal cavity or communication hole extending between the opposite ends of the grip portion, and with this arrangement the weight imbalance and the balance of rotation of the handle are improved.

In the construction of the invention, the grip portion is hollow, and the caps are detachably fixed to and pressed against this grip portion by the resilient force of the resilient member, thus closing the cavity in the grip portion. Therefore, dirt and other foreign matter is prevented from intruding from the exterior into the grip portion, and hence will not be deposited on the support shaft and the retaining member. And besides, the lubricating operation and other operations can be carried out easily.

The caps can be suitably changed in length in accordance with the size of the hand.

In the handle of the invention, the retaining member can be removed, so that the handle piece can be removed from the support shaft. Therefore, adequate maintenance can be performed after fishing.

In the handle of the invention, the cap can be easily attached to and detached from the open end of the grip portion, and the lubricating operation and other operations can be carried out easily.

Therefore, the present invention, provides a handle for a the fishing reel which realizes the practical advantages of maintenance of smooth rotation of the handle piece, and enhanced fishing operability.

What is claimed is:

1. A handle for a fishing reel having a reel body with a drive shaft, said handle comprising:
   a handle arm operatively connected with the drive shaft of the reel body of the fishing reel, and a support shaft fixedly secured to one end of said handle arm;
   a handle piece retainingly supported rotatably on said support shaft, said handle piece comprising:
      a tubular stem mounted on said support shaft and rotatable about an axis:
      a grip portion, continuous with a distal end of said tubular step and extending away from said tubular stem, said grip portion having a cavity extending longitudinally through said grip portion across said axis, and at least one open end forming a mouth of said cavity;
      a cap closing said mouth of said cavity, wherein said cap is detachably mounted onto said open end; and
      a retaining member, removably fitted on a portion of said support shaft protruding from said tubular stem into said cavity, for rotatably supporting said handle piece on said support shaft, wherein upon removal of said retaining member from said support shaft, said handle piece is detachable from said support shaft.

2. A handle for a fishing reel according to claim 1, wherein said tubular stem has a hollow central portion and a pair of larger diameter portions at respective ends of said hollow central portion, and a pair of bearings, disposed in respective said larger diameter portions, for rotatably supporting said tubular stem on said support shaft.

3. A handle for a fishing reel according to claim 2, wherein said bearings are ball bearings.

4. A handle for a fishing reel according to claim 2, wherein said retaining member comprises a screw threadingly engaged with an axial end of said support shaft, and wherein said grip portion has an opening for accessing said screw and an auxiliary cap for closing said opening.

5. A handle for a fishing reel having a reel body with a draft shaft, said handle comprising:
   a handle arm operatively connected with the drive shaft of the reel body of the fishing reel, and a support shaft fixedly secured to one end of said handle arm;
   a handle piece retainingly supported rotatably on said support shaft, said handle piece comprising:
      a tubular stem mounted on said support shaft and rotatable about an axis:

a grip portion, continuous with a distal end of said tubular stem and extending away from said tubular stem, said grip portion having a cavity extending longitudinally through said grip portion across said axis, and two open ends opposite from each other with respect to said axis and respectively forming mouths of said cavity; and two caps detachably mounted respectively onto said open ends and closing said mouths of said cavity.

6. A handle for a fishing reel according to claim 5, further comprising:

a spring extending between said open ends in said cavity for elastically retaining said two caps onto said open ends.

7. A handle for a fishing reel according to claim 6, wherein said open ends of said cavity have stepped portions and said caps have projecting portions engageable with said stepped portions, and wherein each said cap has a retaining member for retaining said spring.

8. A handle for a fishing reel according to claim 7, wherein one of said caps has a mass larger than the other of said caps.

9. A handle for a fishing reel according to claim 6, wherein said open ends of said cavity have first threaded portions, and said caps have second threaded portions threadingly engageable with said first threaded portions.

10. A handle for a fishing reel according to claim 9, wherein each of said caps has a retaining member for retaining said spring.

11. A handle for a fishing reel according to claim 9, wherein at least one of said caps has a retaining washer for retaining said spring and a stepped through hole for rotatably supporting said retaining washer.

12. A handle for a fishing reel having a reel body with a drive shaft, said handle comprising:

a handle arm operatively connected with the drive shaft of the reel body of the fishing reel, and a support shaft fixedly secured to one end of said handle arm;

a handle piece retainingly supported rotatably on said support shaft, said handle piece comprising:
  a tubular stem mounted on said support shaft and rotatable about an axis;
  a grip portion, continuous with a distal end of said tubular step and extending away from said tubular stem, said grip portion having a cavity extending longitudinally through said grip portion across said axis, and at least one open end forming a mouth of said cavity;
  a cap closing said mouth of said cavity, wherein said cap is detachably mounted onto said open end, and wherein said open end of said cavity has a first threaded portion, and said cap has a second threaded portion threadingly engageable with said first threaded portion.

13. A handle for a fishing reel wherein a handle piece is retainingly supported rotatably on a support shaft fixedly secured to one end of a handle arm of the handle adapted to be mounted on a drive shaft of a reel body, said handle piece comprising:

a tubular stem mountable on said support shaft and rotatable about an axis;

a grip portion continuous with a distal end of said tubular stem and extending away from said tubular stem, said grip portion having a cavity extending longitudinally through said grip portion across said axis, and having two open ends opposite from each other with respect to said axis, said two open ends respectively forming mouths of said cavity;

two caps, detachably mountable respectively onto said open ends;

a spring, elastically extendible between said open ends in said cavity, for elastically retaining said two caps onto said open ends; and a retaining member, removably fittable on a portion of said support shaft protruding from said tubular stem into said cavity, for rotatably supporting said handle piece on said support shaft;

wherein upon removal of said retaining member from said support shaft, said handle piece is detachable from said support shaft.

14. A handle for a fishing reel according to claim 13, wherein said open ends of said cavity have stepped portions and said caps have projecting portions engageable with said stepped portions, and wherein each said cap has a retaining member for retaining said spring.

* * * * *